United States Patent [19]
Schneider et al.

[11] Patent Number: 5,261,981
[45] Date of Patent: Nov. 16, 1993

[54] PRODUCTION OF A HOLLOW FILAMENT PACKAGE

[75] Inventors: Klaus Schneider; Rudolf Wollbeck, both of Erlenbach; Thomas Zang, Goldbach, all of Fed. Rep. of Germany

[73] Assignee: Akzo NV, Arnhem, Netherlands

[21] Appl. No.: 933,193

[22] Filed: Aug. 21, 1992

[30] Foreign Application Priority Data

Sep. 4, 1991 [DE] Fed. Rep. of Germany ....... 4129400

[51] Int. Cl.⁵ ............................................ B65H 81/00
[52] U.S. Cl. ...................................... 156/173; 156/169; 156/175; 210/321.8; 210/321.89; 210/500.23
[58] Field of Search ....................... 210/500.23, 321.74, 210/321.8, 321.89; 156/169, 173, 174, 175, 171; 165/172, 177, 180

[56] References Cited

U.S. PATENT DOCUMENTS

| | | |
|---|---|---|
| 3,334,824 | 8/1967 | McClean . |
| 3,422,008 | 1/1969 | McLain .................. 210/321.74 X |
| 3,475,331 | 10/1969 | McLain .................. 210/500.23 X |
| 4,368,124 | 1/1983 | Brumfield ................ 156/173 X |
| 4,430,219 | 2/1984 | Kuzumoto et al. . |
| 4,572,446 | 2/1986 | Leonard et al. . |
| 4,940,617 | 7/1990 | Baurmeister . |

FOREIGN PATENT DOCUMENTS

| | | |
|---|---|---|
| 1800526 | 5/1970 | Fed. Rep. of Germany . |
| 8801711 | 2/1986 | Fed. Rep. of Germany . |
| 3839567 | 6/1990 | Fed. Rep. of Germany . |
| 63-92440 | 4/1988 | Japan ............................ 156/175 |
| WO86/02914 | 5/1986 | PCT Int'l Appl. . |
| 1481064 | 7/1977 | United Kingdom . |
| 2012187 | 7/1979 | United Kingdom . |
| 2210810 | 6/1989 | United Kingdom . |
| 2213461 | 8/1989 | United Kingdom . |
| 85/04339 | 10/1985 | World Int. Prop. O. . |

*Primary Examiner*—Jeff H. Aftergut
*Attorney, Agent, or Firm*—Oliff & Berridge

[57] ABSTRACT

A method for producing a hollow filament package by winding at least one hollow filament onto a rotating body in a plurality of layers in the form of coils using a traversing filament guide device, so that the coils form an angle with the longitudinal axis of the body, wherein the speed of rotation of the body and the traverse speed of the filament guide device are adapted to one another in such a way that, per layer, a plurality of first coils are laid down side by side between the end sections of the body and, after each forming of a first hollow filament coil, the speed of rotation of the body and/or the traverse speed of the filament guide device is changed in such a way that second hollow filament coils are formed on the first or the second end section, the second coils forming an angle with the longitudinal axis of the core greater than the angle formed by the first coils.

11 Claims, 5 Drawing Sheets

PRODUCTION OF A HOLLOW FILAMENT PACKAGE

BACKGROUND OF THE INVENTION

1. Field of the Invention

The invention relates to a process for producing a hollow filament package for manufacturing a hollow filament module by winding at least one hollow filament onto a cylindrical, tubular, many-faced or the like body in a plurality of layers in the form of coils using a traversing filament guide device, which filament guide device moves forwards and backwards essentially parallel to the longitudinal axis of the body while the body rotates about its longitudinal axis, so that the coils form an angle with the longitudinal axis of the body.

2. Description of Related Developments

A process for winding at least one hollow filament into a cross-wound package is known per se. In this known process, the speed of rotation of the body, for example a bobbin, a tube, a core or the like, is not changed between the individual strokes of the filament guide device, nor does the traverse speed of the filament guide device change. This process, therefore, always lays down only one layer of hollow filament per stroke; that is, as the filament guide device returns in the opposite direction it always lays down the next layer. Therefore, the hollow filament packages produced by this process do not have the right hollow filament packing density. Moreover, these hollow filament packages exhibit an inhomogeneous distribution of the space surrounding the hollow filaments, which space, since hollow filaments are frequently also referred to as capillaries, may also be termed the extracapillary space. In these known hollow filament packages, the extracapillary space is thus subdivided into very differently sized voids between the hollow filaments, which can lead to undesirable channelling and to a certain extent also to short circuiting. A further disadvantage is that the length of the hollow filaments is a multiple of the length of the hollow filament package, which leads to high pressure losses within the lumen of the hollow filaments.

SUMMARY OF THE INVENTION

It is therefore an object of the present invention to make it possible to produce wound packages which have not only a predeterminable favorable hollow filament content (packing density or module fill level) for the particular process but also the most suitable capillary length for the proposed use, and a more even subdivision of the space surrounding the hollow filaments.

This object is achieved in relation to the process classified in the preamble by adapting the speed of rotation (number of revolutions per minute) of the body onto which the filament is to be wound and the traverse speed of the filament guide device to one another in such a way that, per layer, a predeterminable plurality of first coils are laid down side by side between the end sections of the body at an angle $\alpha_1$ with the longitudinal axis of the body, forming mutually adjacent first coils of the same layer essentially parallel to one another and a small sideways distance apart and adjacent first coils of successive layers at a crossing angle $2.\alpha_1$ relative to one another, and, after each formation of a first hollow filament coil, temporarily raising the speed of rotation (number of revolutions per minute) of the body and/or reducing the traverse speed of the filament guide device—if necessary to the point of stoppage—in order to form in each case, on the first or second end section of the body, a second coil which forms an angle $\alpha_2$ with the longitudinal axis of the body which is greater than $\alpha_1$.

The process can be carried out with existing packages of hollow filaments but also with freshly spun hollow filaments. In the latter, case, the otherwise customary winding up of the hollow filaments is then replaced by the process according to the invention.

Instead of one hollow filament it is also possible to use at one and the same time a plurality of hollow filaments, for example 5 to 10 or more, which are wound up with one or more filament guide devices to form a hollow filament package. If two or more hollow filaments are fed using the same filament guide device, the hollow filaments are preferably held parallel and a small sideways distance apart, for example by means of a comb-like filament guide, and wound in this arrangement onto the body.

A cylindrical, tubular, many-faced or the like body is to be understood as meaning for example a module core or an unbroken or perforated core tube in the initially uncovered but thereafter already partially covered state. "Many-faced" refers to a body which in cross-section has the shape of a regular polygon, e.g. in the shape of an essentially regular prism.

The initially uncovered body can be made of plastic, a metal, for example steel, or any other suitable material. The choice of material may if desired take into account the desirability of recycling or reusing the body. The initially uncovered body may have individual openings or may be perforated in order to serve as a feed or discharge channel for fluid surrounding the outsides of the hollow filaments. Using the process according to the invention it is easily possible to wind bodies having an outside diameter of from 100 to 300 mm or higher and a length of from 500 to 1500 mm or more.

The process makes it possible to form, for example, alternately a first coil of the first layer and a first coil of the second layer. This is done as follows. The formation of a first coil of the first layer is followed by the formation of a second coil on the first end section of the body, then by the formation of a first coil of the second layer, thereafter by the formation of a second coil on the second end section of the body, then again by the formation of a first coil of the first layer, arranged close to the previously formed first coil of the first layer, then again by the formation of a second coil on the first end section of the body, etc.

The first coils of the hollow filament package form essentially the active part of the hollow filaments, while the second coils, on being embedded later for example in an encapsulation compound, do not partake in the heat or mass transfer process and accordingly form the non-active part of the hollow filaments.

In an embodiment of the invention, the speed of rotation of the body and the traverse speed of the filament guide device are adapted to one another in such a way that the angle $\alpha_1$, formed by the first hollow filament coils with the longitudinal axis of the body, is within the range from 0 to 45° and the angle $\alpha_2$ formed by the second hollow filament coils with the longitudinal axis of the body, is within the range from 45° to 90°. However, this does not mean that a relatively small angle $\alpha_1$ also entails a relatively small angle $\alpha_2$ or that a relatively large angle $\alpha_1$ also entails a relatively large angle $\alpha_2$; on the contrary, it is possible, and it may be very advantageous, for the speed of rotation of the body and the traverse speed of the filament guide device to be adapted to one another in such a way that the angle $\alpha_1$ is for example 5° and the angle $\alpha_2$ from 85° to 90°.

The traverse speed of the element guide device during the formation of the first hollow filament coils and/or during the formation of the second hollow filament coils can also be altered gradually, stepwise or transiently in the course of the winding process, depending on whether precision winding, random winding or any other kind of winding is desired or whether the ratio of the speed of rotation of the body to the traverse speed of the filament guide device is to be interrupted in a specific manner in order to avoid ("break") undesirable patterning within the hollow filament package.

To avoid an excessive build-up of material within the relatively short end sections of the body as a result of too many second hollow filament coils being arranged one on top of the other, a further embodiment of the invention provides that the traverse length of the filament guide device is slightly extended to either side after every traverse or double traverse or according to any other predetermined program, so that in this way second hollow filament coils can be arranged not only on top of one another but also close together side by side. The winding can take place in such a way that in each case a second hollow filament coil laid down in a certain position is covered by the subsequent hollow filament coil in this position and is thus fixed in place by it. To obtain with this procedure a hollow filament package which has parallel outer contours even in its end sections, the body on which the filament is to be wound can have end sections which are tapered in the direction of the end faces of the body, i.e. end sections the cross-sectional areas of which decrease in the direction of the end faces of the body, viz. are for example conical or frustoconical in shape. The end sections of the body may also have such a shape in a subregion only, i.e. over a distance which is less than their total length.

The adhesion of the hollow filament coils on the initially uncovered body can be augmented by using contact adhesives, adhesive tapes and the like. This is the case in particular for those areas of the end sections of the body where a first coil becomes a second coil and a second coil becomes a first coil, i.e. areas where a sudden change in the angle $\alpha$ takes place. To improve the adhesion of the most recently deposited hollow filament coil on the hollow filament package, in particular in the areas of transition from a first coil to a second coil or from a second coil to a first coil, it is possible to employ a contact adhesive, a reactive resin, a thermally or ultrasonically produced weld point or the like in order to bond the hollow filament coils together at their points of contact (cross-over points).

The process can be carried out in such a way that the direction of rotation of the body on to which the hollow filament is to be wound is retained during the entire winding process, i.e. until the package is complete; in other words, there was no reversal of the direction of rotation at any time.

The hollow filament package produced according to the invention can be used to manufacture a hollow filament module for heat and/or mass transfer, depending on which hollow filaments are used. For heat transfer purposes the hollow filaments used generally have a non-porous, fluid-impermeable wall, while hollow filaments used for mass transfer may have a porous, microporous, a semi-permeable, a selectively permeable, i.e. membrane-like, wall and the like.

The manufacture of a hollow filament module from a hollow filament package produced according to the invention can be carried out in a conventional manner, for example by embedding the end portions of the hollow filaments which form the end sections of the hollow filament package, i.e. essentially the second coils, in a curable encapsulation compound, curing the encapsulation compound, and then partially removing some of the encapsulation structure at each end of the hollow filament package in order to provide access to the continuous bore, or lumen, of each hollow filament. However, it is also possible to open the hollow filaments only at one end of the hollow filament package or to embed them in the first place at one end only. The hollow filament modules manufactured in this or some other way can then be installed in a conventional manner with the necessary seals in appropriately dimensioned housings which are equipped with connections for supplying and removing the gaseous, vaporous and/or liquid substances (fluids) intended for heat or mass transfer. Such apparatus is sufficiently well known and therefore will not be described here more particularly.

The process according to the invention is very particularly suitable for producing hollow filament packages which are intended for manufacturing hollow filament modules for gas separation. Hollow filaments suitable for gas separation have for example an outside diameter of 200 to 300 $\mu$m, can be produced by a dry or wet spinning process, and can subsequently additionally be subjected to a coating process. If the speeds for producing the hollow filaments, coating the hollow filaments and producing hollow filament packages are adapted to one another, all three process steps can be carried out in succession without interruption, in which case the hollow filament packages are then produced with freshly coated and spun hollow filaments, for which production and processing speeds of from 5 to 40 m/min are achieved without problems.

In a further embodiment of the process according to the invention, it is possible, during the production of a hollow filament package, to feed a piece of film or the like which extends in the longitudinal direction of the hollow filament package from one end section to just short of the other end section at least once during a rotation of the body through at least 360°, so that the film encloses the previously formed package by at least 360° in the area mentioned. This can take place, for example, when half the length of hollow filament to be wound up has been wound onto the package or when half the total number of hollow filament layers envisaged, i.e. half the intended thickness of the hollow filament package, measured in the radial direction, has been reached. This, by analogy, also applies to the case of more than just one film being introduced in the above-described manner. This at least one film interlayer in the hollow filament package can later also be embedded along one of its sides in the embedding of the end portions of the hollow filaments in a curable encapsulation compound. The piece of film then serves to subdivide the space surrounding the hollow filaments and, given an appropriate arrangement of the feed and discharge orifice(s) for the fluid flowing around the hollow filaments, acts like a guide plate whereby the fluid is initially guided in longitudinal direction through some of the hollow filament layers, then deflected and guided in the opposite direction through the other hollow filament layers.

In this embodiment of the process it is also possible, after the introduction of the film(s), to introduce a different hollow filament grade from that previously, for example one which has different separating properties, a different separating efficiency of the like.

During the winding of the package it is possible by applying, for example, a reactive resin or an adhesive, to form annular elements distributed over the length of the hollow filament package which do not extend over the entire thickness of the hollow filament package, viewed in the radial direction, and which will later serve as deflecting means (plates) for the fluid flowing around the hollow filaments, which makes it possible to obtain a crosswise-concurrent or cross-wise countercurrent flow, relative to the fluid flowing through the hollow filament.

Using a similar manner to that described above it is also possible to carry out the embedding of the end sections of the hollow filament package by applying the embedding compound during the winding process.

Moreover, during the production of the hollow filament package, the angle $\alpha_1$, formed by the first coils with the longitudinal axis of the body onto which the hollow filament is to be wound, can be altered continuously or stepwise or else just once, so that a different fill level, i.e. a different hollow filament density, is achieved within the hollow filament package. Similarly, it can be of advantage to change the angle $\alpha_2$ during the winding process.

The ready-produced hollow filament package, or the hollow filament module manufactured therefrom, can be surrounded with a film or a tight-fitting tube in order to avoid unproductive flows due to channelling. Similarly, the shell of the housing into which the hollow filament module is installed, as described earlier, can be dimensioned in such a way that it represents a close fit for the hollow filament module. To protect the hollow filament module it may also be surrounded by a protective grid or tube which has inlet and outlet openings for the fluid flowing around the hollow filaments.

If flow is to be in the radial direction of the hollow filament module, i.e. essentially perpendicular to the longitudinal axis of the hollow filaments, the body onto which the hollow filament is wound is a perforated or porous fluid-permeable core tube. If, however, the flow through the hollow filament module is to be in the longitudinal direction of the hollow filaments, the body used for winding on the hollow filament is a solid core or a core tube having a fluid-impermeable wall or the like. All these means and their functioning in appropriate apparatus are known per se and therefore will not be described here more particularly.

If modules fabricated from hollow filament packages produced according to the invention are used for gas separation, it has been found that it is advantageous for the gas mixture to be separated, for example air, to flow around the hollow filaments in the longitudinal direction, specifically in countercurrent to the separated-off gas (mixture) flowing through the hollow filaments. For this the hollow filaments, as mentioned earlier, need be open at one end only, although the unopened end region of the hollow filaments at the other end of the hollow filament module may also be embedded in order to give a dimensionally stable hollow filament module. In this case the shape of the hollow filaments is similar to a U or hairpin.

The invention will now be more particularly described with reference to the drawings.

BRIEF DESCRIPTION OF THE DRAWINGS

In a partly simplified schematic form of representation:

FIG. 5 shows an apparatus for gas separation, filtration or the like.

DESCRIPTION OF PREFERRED EMBODIMENTS

Figure 1:
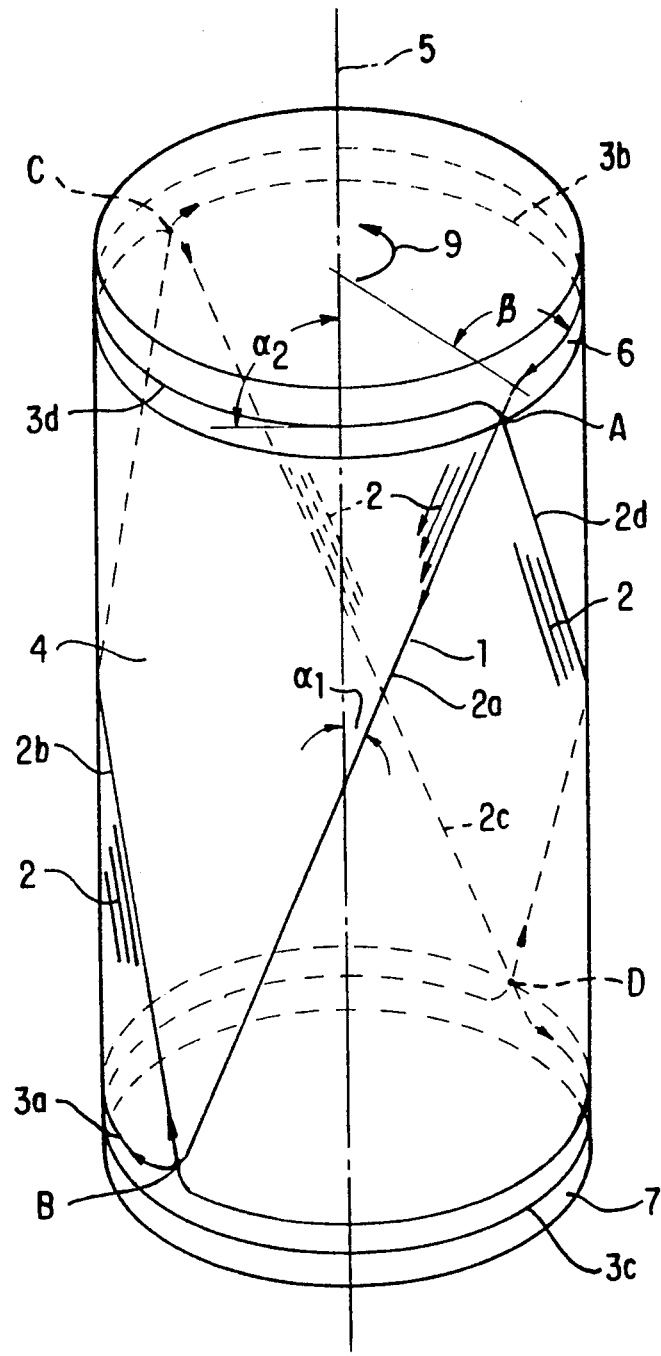
FIG. 1 shows the winding process in an embodiment of the process according to the invention.

FIG. 1 illustrates an embodiment of the process where four first hollow filament coils 2a to 2d of a hollow filament package are formed in succession, followed in succession by further first hollow filament coils 2, which are each arranged essentially parallel to and at a small sideways distance from the adjacent first coils 2a to 2d formed previously, and so forth. Starting at point A on the first end section 6 of body 4, a hollow filament 1 is laid, by means of a traversing filament guide device (not shown) to point B on the second end section 7 of body 4 during a rotation of body 4 about its longitudinal axis 5 through 90° in the direction of rotation indicated by the arrow 9, forming a first coil 2a, which forms an angle $\alpha_1$ with the longitudinal axis 5 of body 4. Thereafter the speed of rotation (number of revolutions per minute) of body 4 is increased while the traverse speed of the filament guide device (not shown) is reduced to zero until, after rotation of body 4 through about 360°, point B on the second end section 7 of body 4 has been reached again. In this way the second hollow filament coil 3a is formed. After point B has been reached, the speed of rotation of body 4 is again reduced and the filament guide device is moved back from the second end section 7 of body 4 to the first end section 6 of body 4 until, after a rotation of body 4 through about 90°, point C has been reached, forming the next first coil 2b, the direction of lay-in of the first hollow filament coil 2b being opposite to the direction of lay-in of the first hollow filament coil 2a. Thereafter the speed of body 4 is again increased during a rotation through about 360° and the traverse speed of the filament guide device reduced to zero until point C on the first end section 6 has been reached again to form a further second hollow filament coil 3b, which forms an angle $\alpha_2$ with the longitudinal axis 5 of body 4, which angle $\alpha_2$ is in this case essentially 90° and hence greater than the angle $\alpha_1$. The coil 2c is formed from point C to point D during a 90° rotation of body 4. After point D has been reached, the speed of body 4 is increased again and the coil 3c is produced during a rotation of body 4 through about 360° while the filament guide device is stationary. The direction of rotation of the first hollow filament coil 2c and of the first hollow filament coil 2a are the same. Laying down a hollow filament from D to A during a 90° rotation of body 4 with the filament guide device traversing from end section 7 to end section 6 produces the hollow filament coil 2d. After point A has been reached, the filament guide device is stopped again and the speed of body 4 is increased during a rotation through for example about 359° or 361° until a point has been reached on the first end section 6 of the body 4 which in FIG. 1 is slightly to the left, as drawn, or to the right of the starting point A, whereupon the above-described procedure starts again, so that now all the subsequently formed first hollow filament coils 2 are arranged essentially parallel to and at a small sideways distance from the respective previously formed directly adjacent first coils 2a or 2b or 2c or 2d. This procedure can be repeated as often as necessary until the desired thickness of the hollow filament package formed in this way is achieved. The hollow filament package is built up as follows, seen from in to out: a first layer consisting of the first hollow filament coils 2a, a second layer consisting of the first hollow filament coils 2b which form a crossing angle $2.\alpha_1$ with the first hollow filament coils 2a, then a third layer formed by the first hollow filament coils 2c which form a crossing angle $2.\alpha_1$ with the first hollow filament coils 2b, and a fourth layer formed by the first hollow filament coils 2d which likewise form a crossing angle $2.\alpha_1$ with the first hollow filament coil 2c. This is followed by another layer of first hollow filament coils 2a and so on.

In the above-described procedure, the body 4 is rotated around its longitudinal axis through somewhat more than 3 times 360° before a further first hollow filament coil 2a is formed, namely through about 90° each time the first hollow filament coils 2a to 2d are formed, i.e. in total through 4 times about 90°, and each time through about 360° during the formation of the second hollow filament coils 3a to 3d, i.e. in total 5 times through about 360°, although the last rotation of body 4 in the formation of the second hollow filament coils 3d takes place through somewhat more or less than 360°, for example 359° or 361°, in order—as described earlier—that all the subsequent first coils 2 may be arranged at a small sideways distance from the respective previously formed adjacent first coils already on the body 4.

Of course, through further refinements of the process it is possible, given a different relationship between the traverse speed of the filament guide device and the speed of rotation (number of revolutions per minute) of body 4 during the formation of the first hollow filament coils 2, a different duration of rotation of body 4 and/or duration of the reduced traverse speed of the filament guide device during the formation of the second hollow filament coils 3 on the end sections 6 and 7 of body 4 to obtain a different number of layers, different angles $\alpha_1$ and/or $\alpha_2$ etc.

In the same way, i.e. using the same sequence of operations, it is possible to produce a hollow filament package by rotating body 4 each time not through 360° (or 361° or 359°) but only through 180° (or 181° or 179°). This version consumes less hollow filament material, since less material is wound onto the end sections 6; 7. However, in this case the second hollow filament coils, measuring about 180°, must be temporarily or permanently immobilized on the end sections, for example by means of a mechanical holder, an adhesive or the like, to prevent any sloughing thereof.

The filament guide device (not shown) can be programmed to place each successive second coil at each end of the body 4 in a position slightly longitudinally displaced from the previous second coil to avoid overlapping of the second coils and thus a build-up of the second coils at the end sections 6 and 7. For example, if after each transverse or double traverse of the filament guide, its transverse is extended slightly, the coil 3c is longitudinally displaced by a small distance from the coil 3a and, likewise, coil 3d is spaced from coil 3b, as shown in somewhat exaggerated fashion in FIG. 1. A similar effect can be achieved by shortening the traverse of the filament guide with each successive traverse.

Figure 2:
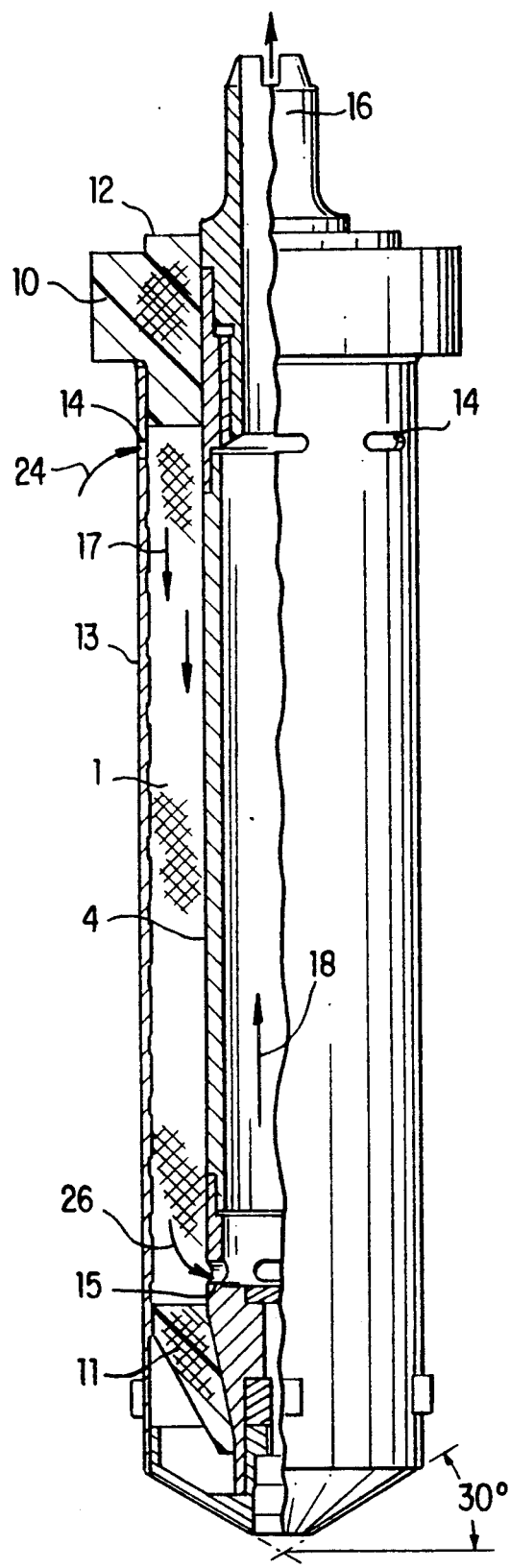
FIG. 2 shows a gas separation apparatus.

FIG. 2 is a partially sectioned representation of an apparatus for separating air into an oxygen-rich gas mixture and a nitrogen-rich gas mixture. The apparatus consists essentially of a hollow filament module manufactured from a hollow filament package produced according to the invention. The hollow filament module consists of the hollow filaments 1 which have been arranged in a plurality of layers in the form of coils on the core tube 4 according to the invention and whose end portions, which form the end sections of the hollow filament package produced according to the invention, i.e. essentially the second coils, have been embedded in the two encapsulation compound structures 10 and 11. In this embodiment, the hollow filaments 1 are open at the upper end only of the hollow filament module, i.e. at end face 12 of the upper encapsulation compound structure 10. The shell tube 13 has in its upper part inlet openings 14 for the gas mixture to be separated, in the present example air. The core tube 4 has at its lower end openings 15 which establish a communication between the extracapillary space of the hollow filament package and the interior of the core tube 4. At its upper end the gas separation apparatus has the exit pipe 16 with an exit opening (see arrow) for the gas (mixture) emerging from the inside of the core tube 4. The gas separation apparatus depicted in FIG. 2 can be installed as usual using seals or the like into an appropriately dimensioned housing which has connections for feeding and discharging the gas mixtures. The gas separation apparatus depicted in FIG. 2 works as follows. The gas mixture to be separated (depicted by arrow 24), i.e. air in the present example, is passed under a pressure of, for example, 10 bar through the inlet openings 14 into the extracapillary space of the hollow filament package, where it flows downwards, as depicted by the arrow 17, and around the hollow filaments i.e. along the outer surface of the hollow filaments 1. all the while oxygen passes preferentially through the wall of the hollow filaments 1 into the internal hollow space (lumen) of the hollow filaments 1, and the oxygen-rich gas mixture formed in this way flows through the lumen of the hollow filaments 1 in the opposite direction, i.e. upwards, and passes out at the open ends of the hollow filaments 1, i.e. at end face 12 of the upper encapsulation compound structure 10, where it can be collected and discharged. The oxygen-depleted gas mixture (air), i.e. the nitrogen-rich gas mixture, passes through the openings 15 (see arrow 26) into the core tube 4, where it flows upwards as indicated by the arrow 18, and passes out through the exit opening (see arrow) in pipe 16 of the gas separation apparatus. In this process, the gas mixture which becomes depleted in oxygen (the feed gas) and the oxygen-rich gas mixture (permeate) are in countercurrent flow. The direction of flow of the nitrogen-rich gas mixture (retentate) is immaterial here, since no mass transfer takes place on the inside of the core tube 4. The exit pipe 16 could thus also be arranged at the lower end of the gas separation apparatus.

Figure 3:
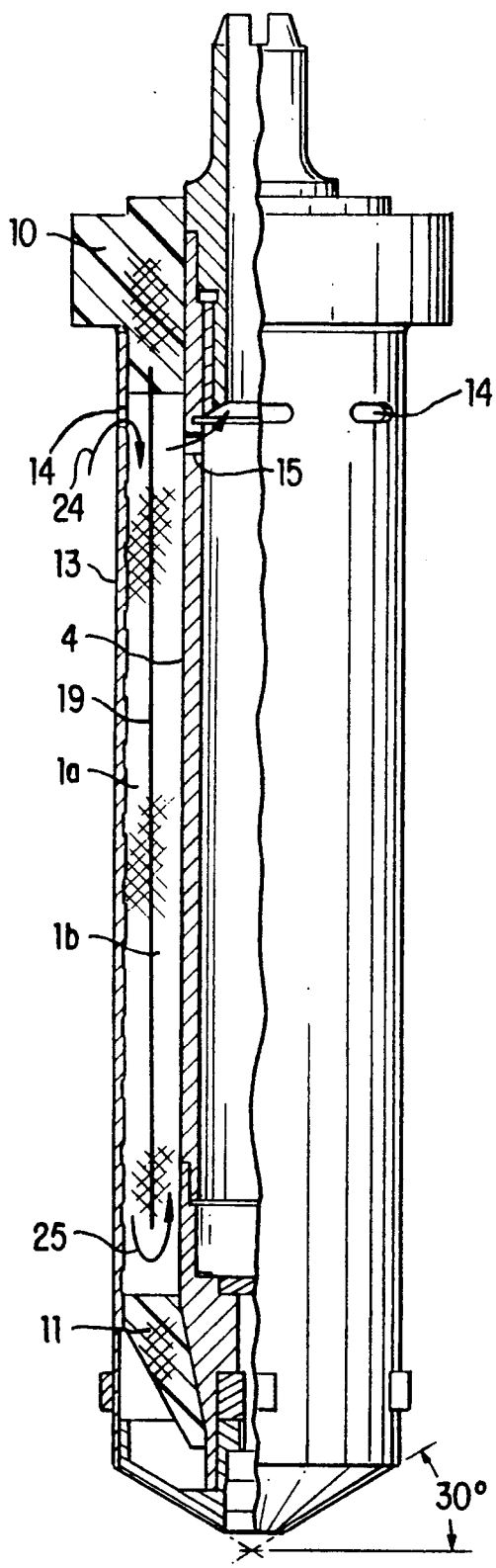
FIG. 3 shows a gas separation apparatus comprising a hollow filament module manufactured from a wound package produced by an embodiment of the process according to the invention.

FIG. 3 is a partially sectioned representation of a gas separation apparatus comprising a hollow filament module manufactured from a package produced according to an embodiment of the process. The apparatus has otherwise essentially the same parts as that depicted in FIG. 2 except for those parts to which particular attention will be drawn in what follows and which will be more particularly described. The gas separation apparatus depicted in FIG. 3 has a partition wall 19 which extends from the upper encapsulation compound structure 10 to just short of the lower encapsulation compound structure 11 and which acts as a guide or deflector plate. Such a partition wall 19 can be obtained in particular by feeding a piece of film or the like during the production of the hollow filament package during a rotation of the core tube 4 through at least 360° and wrapping it around the previously formed hollow filament package, so that it encloses the package to an extent of at least 360°. The gas mixture supplied through the entry openings 14 (arrow 24) and entering the extracapillary space of the hollow filament package is initially guided by the partition wall 19 along the outer hollow filaments 1a of the hollow filament package and in the representation shown in FIG. 3 it flows downwards. At the lower end of the partition wall 19 the gas stream is deflected (see arrow 25) and then flows in the opposite direction, i.e. upwards, along the inner hollow filaments 1b of the hollow filament package. The passage openings 15 which join the extracapillary space to the inside of the core tube 4 and through which the retentate can flow into the inside of the core tube (see arrow) are in this embodiment arranged at the upper end of the core tube 4, i.e. in the vicinity of the upper encapsulation compound structure 10. As for the rest, this embodiment of the gas separation apparatus is constructed and functions in exactly the same manner as that depicted in FIG. 2 and previously described, so that further explanation is superfluous.

Figure 4:
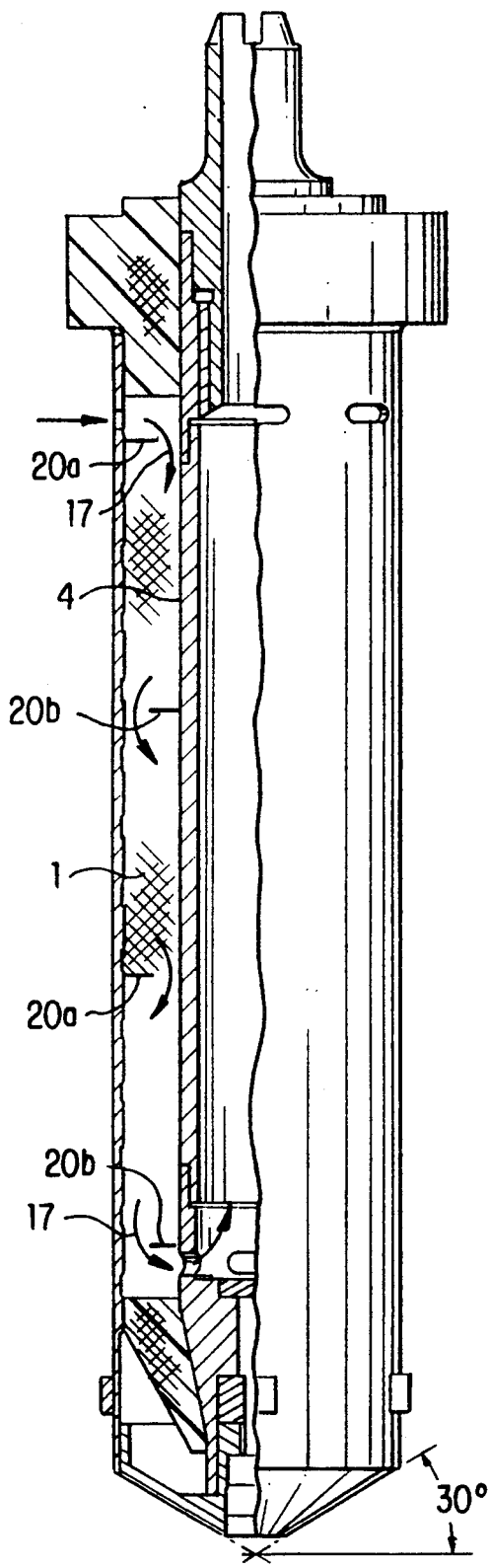
FIG. 4 shows a gas separation apparatus comprising a hollow filament module manufactured from a wound package produced by a further embodiment of the process according to the invention.

FIG. 4 shows a further embodiment of a gas separation apparatus which contains a hollow filament module which has been manufactured from the package which was produced according to a further embodiment of the process. This apparatus is constructed and functions in the same way as that depicted in FIG. 2 and previously described, except for the single difference which will be more particularly described hereinafter. The embodiment of FIG. 4 has four deflecting walls 20 distributed over the length of the hollow filament package, which cause the gas mixture which flows through the extracapillary space of the hollow filament package, i.e. the feed gas, to be deflected and hence bring about better mass transfer (see arrow 17). These deflecting walls 20 can be obtained for example by adding continuously a reactive resin, adhesive or the like during the production of the hollow filament package in those areas where deflecting walls 20 are to be formed. The deflecting walls 20 are annular in shape, the deflecting walls 20a having an outside diameter which corresponds to the outside diameter of the hollow filament package and an inside diameter which is greater than the inside diameter of the hollow filament package alternating with a deflecting wall 20b having an outside diameter which is smaller than the outside diameter of the hollow filament package and has an inside diameter which corresponds to the inside diameter of the hollow filament package, i.e. the outside diameter of core tube 4. The deflecting walls 20 act like deflecting plates in that the gas mixture flowing around the hollow filaments 1 and the gas mixture flowing into the hollow filaments are in cross-counterflow relative to one another in this embodiment.

The gas separators depicted in FIGS. 2 to 4 have been described and illustrated essentially with reference to the example of separating air into an oxygen-rich and a nitrogen-rich gas mixture. However, it will be readily understood that such apparatus, depending on the nature of the hollow filaments used, can also be used in other mass separation or transfer processes and also for heat transfer. If used for heat transfer, the hollow filaments are in general opened at both ends of the hollow filament package after they have been embedded in a curable encapsulation compound, so that the inside (lumen) of the hollow filaments is freely accessible. The use of such hollow filament modules for heat transfer is known per se and will therefore not be more particularly described. Similarly, the hollow filament modules proposed for heat transfer duty can have one or more separating walls 19 as depicted in FIG. 3 or deflecting walls 20 as depicted in FIG. 4.

Figure 5:
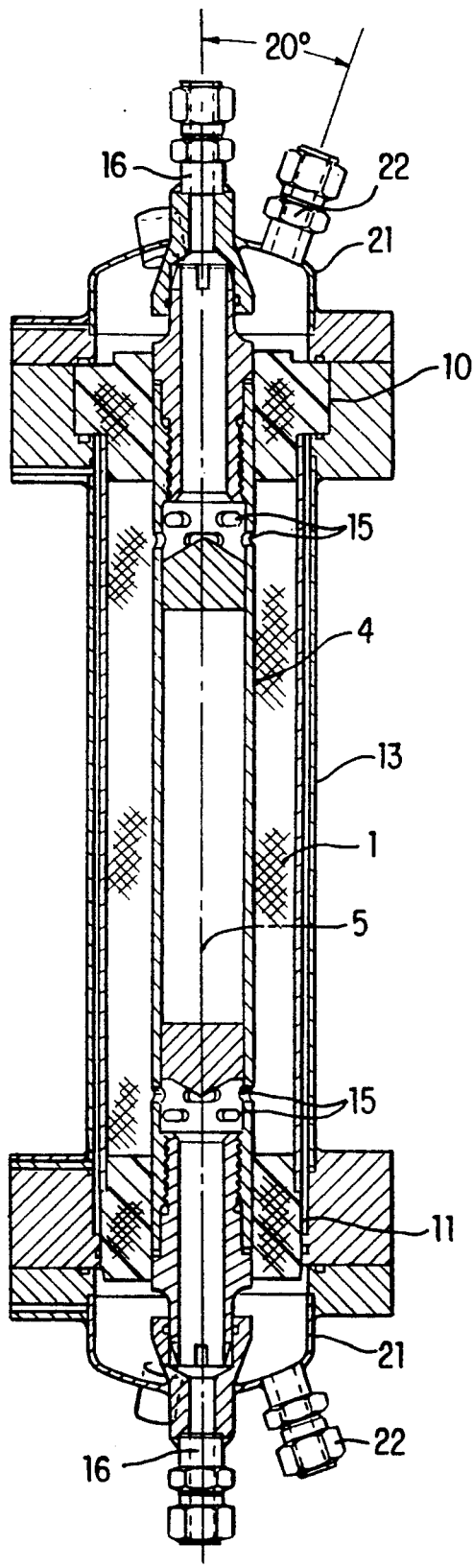

FIG. 5 shows an apparatus which contains an embodiment of a hollow filament module, wherein the hollow filaments 1 have been opened on both sides, i.e. not only on the side of encapsulation compound structure 10 but also on the side of encapsulation compound structure 11. The two housing lids 21 of the apparatus have a connection pipe 22 for the fluid which is following or has flowed through the interior (lumen) of the hollow filaments 1. This apparatus too is suitable for use as a gas separator, but also—given a suitable choice of hollow filaments—for use as a heat exchanger, filter or for other mass separation, exchange or transfer processes. In these processes, the apparatus can be used not only in countercurrent but also in concurrent operation. Since this apparatus is known per se except for the hollow filament package produced according to the invention, the other parts of this apparatus will here not be more particularly described and illustrated.

What is claimed is:

1. A method for producing a hollow filament package comprising the steps of: winding at least one hollow filament onto a body having first and second end sections in a plurality of layers in a form of coils using a traversing filament guide device, which filament guide device moves forwards and backwards at a changeable speed between the first and second end sections in a manner essentially parallel to a longitudinal axis of the body, while the body is rotated at a changeable speed about the longitudinal axis, so that the coils form an angle with the longitudinal axis of the body; relating the speed of rotation of the body and the traverse speed of the filament guide device to one another in such a way that, in each layer, a first plurality of first coils are laid down side by side between the end sections of the body at an angle $\alpha_1$ to the longitudinal axis of the body; arranging mutually adjacent first coils of the same layer essentially parallel to one another and a small sideways distance apart; laying down a second plurality of first coils of successive layers at a crossing angle of about $2.\alpha_1$ relative to the first plurality of coils; and, after each formation of a first hollow filament coil, changing a relationship between movement of the filament guide device and the speed of rotation of the body by one or both of temporarily raising the speed of rotation of the body and reducing the traverse speed of the filament guide device, in order to form on the first or the second end section of the body, a second hollow filament coil which forms an angle $\alpha_2$ with the longitudinal axis of the body, angle $\alpha_2$ being greater than angle $\alpha_1$.

2. A method according to claim 1, wherein the speed of rotation of the body and the traverse speed of the filament guide device are related to one another in such a way that $\alpha_1$ is within a range from about 0° to 45° and $\alpha_2$ is in a range of about 45° to 90°.

3. A method according to claim 1, wherein a traverse length of the filament guide device is slightly extended to either side of the traverse, after every traverse or double traverse of the body.

4. A method according to claim 1, further comprising the step of at least once during a rotation of the body through at least 360°, introducing a film extending in a longitudinal direction of the hollow filament package from the first end section of the body to a location adjacent the second end section of the body, so that the film encloses a previously formed hollow filament package by at least 360°.

5. A method according to claim 1, further comprising the step of forming, in an area between the first and second end sections of the body, at least one annular element which extends over a portion of a thickness of the hollow filament package, measured in a radial direction, and which acts as a deflecting wall for fluid flowing around the hollow filaments.

6. A method according to claim 5, wherein the annular element is formed by deposition of a reactive resin or adhesive.

7. A method according to claim 1, further comprising the step of embedding a end portions of the hollow filaments comprising the second hollow filament coils in an embedding material.

8. A method according to claim 7, wherein the embedding material is applied as the hollow filament material is wound on the body.

9. A method according to claim 1, further comprising the step of altering the angle $\alpha_1$ during winding so that a different fill density is achieved within the hollow filament package.

10. A method according to claim 1, wherein, when the second hollow filament coils are formed, the body is rotated approximately 360°.

11. A method according to claim 1, wherein, when the first hollow filament coils are formed, the body is rotated between 90° and 180°.

* * * * *